United States Patent [19]

Rust

[11] 4,332,831

[45] Jun. 1, 1982

[54] METHOD OF PREPARING SALTED CHEESE CURD LOAVES

[75] Inventor: Robert R. Rust, Cumberland, Wis.

[73] Assignee: Universal Foods Corporation, Milwaukee, Wis.

[21] Appl. No.: 170,004

[22] Filed: Jul. 18, 1980

Related U.S. Application Data

[62] Division of Ser. No. 879,965, Feb. 21, 1978, Pat. No. 4,244,286.

[51] Int. Cl.³ ................... A23C 19/02; A01J 25/11; A01J 25/12
[52] U.S. Cl. .................... 426/582; 99/459; 426/478; 426/491; 426/495
[58] Field of Search .............. 426/36, 478, 495, 582, 426/491; 99/466, 459, 456; 425/85, 199

[56] References Cited

U.S. PATENT DOCUMENTS

| | | | |
|---|---|---|---|
| 3,032,877 | 5/1962 | Collins | 99/466 X |
| 3,140,185 | 7/1964 | Pinckney | 426/36 |
| 3,217,411 | 11/1965 | Boer | 425/199 |
| 3,404,009 | 10/1968 | Lambert et al. | 426/478 |
| 3,468,026 | 9/1969 | Robertson et al. | 425/85 X |
| 3,543,403 | 12/1970 | Speglic et al. | 426/582 X |
| 3,606,683 | 9/1971 | Joux et al. | 426/491 |
| 3,891,783 | 6/1975 | Robertson et al. | 426/491 |
| 3,961,077 | 6/1976 | Kielsmeier | 426/36 |
| 3,982,480 | 9/1976 | Kamphuis | 99/456 |
| 4,061,794 | 12/1977 | Charles | 426/478 X |
| 4,068,014 | 1/1978 | Heimbruch | 426/582 |
| 4,226,888 | 10/1980 | Siecker | 426/582 X |
| 4,244,972 | 1/1981 | Johnson | 426/582 X |

OTHER PUBLICATIONS

Davis, J. G., Cheese, vol. I, American Elserier Publishing Co., Inc., 1965 (pp. 277–285).

Primary Examiner—David M. Naff
Attorney, Agent, or Firm—Neuman, Williams, Anderson & Olson

[57] ABSTRACT

A method and apparatus is disclosed for continuously producing salted cheese curd loaves by separating cheese curd from whey, blending salt with the separated curd in essentially the amount of salt desired in the final cheese being produced, forming the salted curd into a compacted outwardly tapered column and further separating whey from the curd, sequentially severing and discharging cheese curd loaves from the column, pressing the cheese curd loaves while in forms, immersing the pressed loaves into a brine solution for a time sufficient to form a rind on the loaves but insufficient to substantially alter the salt content of the loaves, and curing the rinded cheese curd loaves for a period of time required for the type of cheese being produced. This method shortens the brine curing time for hard cured cheese, and the method and apparatus enable semi-automated and continuous production of cheese curd loaves.

5 Claims, 4 Drawing Figures

METHOD OF PREPARING SALTED CHEESE CURD LOAVES

This is a division of application Ser. No. 879,965, filed Feb. 21, 1978, now issued as U.S. Pat. No. 4,244,286.

BACKGROUND OF THE INVENTION

1. Field of the Invention

This invention relates generally to the manufacture of cheese, and more particularly, concerns an apparatus and method for preparing a salted cheese curd loaf for subsequent pressing, brining and aging.

2. Description of the Prior Art

While natural cheese enjoys wide use by consumers in many forms, it is a relatively expensive product due in great part to the use of hand labor and the long processing time required to produce the cheese and develop the distinctive flavors by prior art methods. Under the circumstances, it is highly desirable to accelerate the production of natural cheeses and minimize hand labor, thereby decreasing the cost thereof.

The conventional, natural cheese processing and manufacturing processes involve the formation of a cheese curd from milk. Customarily, pasteurized milk is inoculated with a cheese starter culture of a selected microorganism, culturing the inoculated milk to develop the requisite flavor, adding rennet or another suitable coagulant to the cultured milk to form a curd, tabling or otherwise draining excess whey from the curd, cutting the curd and placing the curd in hoops or other suitable forms, usually in a cheesecloth wrapper to form a loaf, pressing the curd loaf to remove the residual whey, removing the pressed loaf and placing the same in a brine solution to develop the rind and provide the requisite salting of the cheese, removing the loaf from the brine and aging the brined loaf for a predetermined period of time to produce a cured cheese product which meets the appropriate standard of identity for the cheese being made.

These operations have been and, to a large extent, still are carried out by hand, which involves the considerable expense associated with hand labor and also introduces the undesirable factors of contamination by workers, non-uniformity of product due to human variations in procedures and the possibility of worker injury, and fatigue in the handling of cheese or curd at various stages of manufacture. Hand processing as traditionally practiced also results in a greater exposure to dust and airborne contaminants (microorganisms). Needless to say, the processes and procedures of the prior art are costly and lead to uneven results. The brining of cheeses, particularly associated with the production of hard cheeses, often requires periods of time of 21 to 22 days. Desirably, this brining time could also be advantageously shortened to thereby reduce costs.

While various automated procedures are known to the art, they are, in large part, directed to the making of so-called "cheese foods" or, if used with natural cheese production, have not been completely satisfactory.

For example, U.S. Pat. No. 3,468,026 (1969) describes an apparatus and method whereby a crumpled cheese curd is formed into a rectangular pillar of curd under vacuum and the lower end of the pillar is severed to form a block of curd which is then compressed in a vacuum chamber and then wrapped in a moisture and air impermeable material and further compressed between rigid panels to form a completely sealed cheese block. The wrapped cheese curd block is then permitted to cure or age for the requisite period of time.

U.S. Pat. No. 3,606,683 (1971) describes an apparatus for continuously separating curd and whey wherein the mixture of curd and whey is introduced into an agitated decanting zone and liquid whey decanted from the top of the vessel. The curd continues downward into the vessel and enters a vertical pressing zone having a perforated wall for removing residual whey. The curd is then pumped from the bottom of the vessel for further processing, including collection in molds.

U.S. Pat. No. 3,217,411 (1965) describes an apparatus wherein curd is placed in a number of sieve tubes which are disposed to rotate with respect to a table surface and discharge into one or more molds on the table.

U.S. Pat. No. 3,032,877 (1962) describes a drainer for curd and the like comprising a cylindrical screen disposed within a container. Whey from a curd surrounding the cylindrical screen drains into the central aperture and out of the vessel.

U.S. Pat. No. 3,982,480 (1976) describes a draining column for curd having a generally perforate construction surrounded by a spaced jacket. Means are provided for equalizing the pressure of fluid generated by the column of curd and whey in the inner cylindrical chamber.

Accordingly, it is an object of the present invention to provide an improved apparatus and method for making cheese and, more particularly, a cheese curd loaf, which overcomes or eliminates many of the problems of prior art methods.

It is also an object of the present invention to provide an apparatus and method for preparing a salted cheese curd loaf for the preparation of hard cheeses which shorten the brine curing time required by known methods for making hard cured cheeses.

Another object of the present invention is to provide an apparatus and method for preparing a salted cheese curd loaf which provides for improved sanitary processing conditions and essentially eliminates human contact.

An additional object is the provision of an apparatus and method for preparing a salted cheese curd loaf which results in minimal handling of the product and improved safety and working conditions for the personnel involved in the manufacturing operations.

A further object of the present invention is an apparatus and method for preparing a salted cheese curd loaf which is semi-automated and capable of continuous operation.

Other objects and advantages of the invention will become apparent upon reading the following detailed description and appended claims, and upon reference to the accompanying drawings.

SUMMARY OF THE INVENTION

The foregoing and other objects of the present invention are achieved by the herein described improved apparatus and method for preparing a salted cheese curd loaf.

The apparatus of the invention broadly comprises first means for continuously dewheying a mixture of cheese curd and whey introduced at the inlet end thereof to thereby remove a preponderance of whey and discharge a substantially dewheyed curd at the outlet end thereof, a blender means adapted to receive dewheyed cheese curd from the dewheying means and provided with a valved outlet means for discharge of the contents thereof, salt addition means coordinated with the dewheying means for the simultaneous, controlled, portion-wise introduction of salt and curd into the blender, a curd accumulation and draining column means of generally cylindrical shape having an opening at the top communicating with the discharge valve of the blender means, a bottom portion for accumulating a column of cheese curd therein and a side wall having a perforated sector formed therein, jacket means spaced from and surrounding the draining column means, curd level sensor means disposed inside the top portion of said draining column adapted to sense the level of cheese curd contained therein and cooperatively control the discharge valve from the blender to maintain a predetermined level of curd therein, a first guillotine valve means cooperating with the open bottom portion of the draining column positionable between a closed, curd accumulating position and an open, curd discharge position, a loaf-forming sleeve of essentially the same diameter as the draining column and positioned immediately beneath the first valve means, a second guillotine valve means cooperatively positioned at the other end of the loaf-forming sleeve, said valve being positionable in a closed, loaf-forming and holding position and an open, loaf-discharging position, conveyor means for introducing cheese loaf mold forms in a curd loaf receiving and loading position immediately beneath the second guillotine valve, and means for removing loaded cheese loaf mold forms from said position beneath the said second valve means.

An improved method for preparing a hard cheese having a reduced brining time is also provided which comprises continuously dewheying a first mixture of cheese curd and whey, discharging the dewheyed curd into an agitated blending zone, continuously adding salt to the curd discharged from the dewheying zone, discharging the blended, salted curd into a curd accumulation and draining column to form and maintain a predetermined column of drained, compacted, salted cheese curd, continuously forming a series of salted, dewheyed cheese curd loafs at the discharge end of the draining column, placing the curd loaf into forms for pressing and forming the cheese in loafs and placing the curd loaf in a brining solution for a period sufficient to develop a rind.

BRIEF DESCRIPTION OF THE DRAWINGS

For a more complete understanding of this invention, reference should now be made to the embodiment illustrated in greater detail in the accompanying drawings and described below by way of an example of the invention. In the drawings.

DETAILED DESCRIPTION OF THE DRAWINGS

Figure 1:
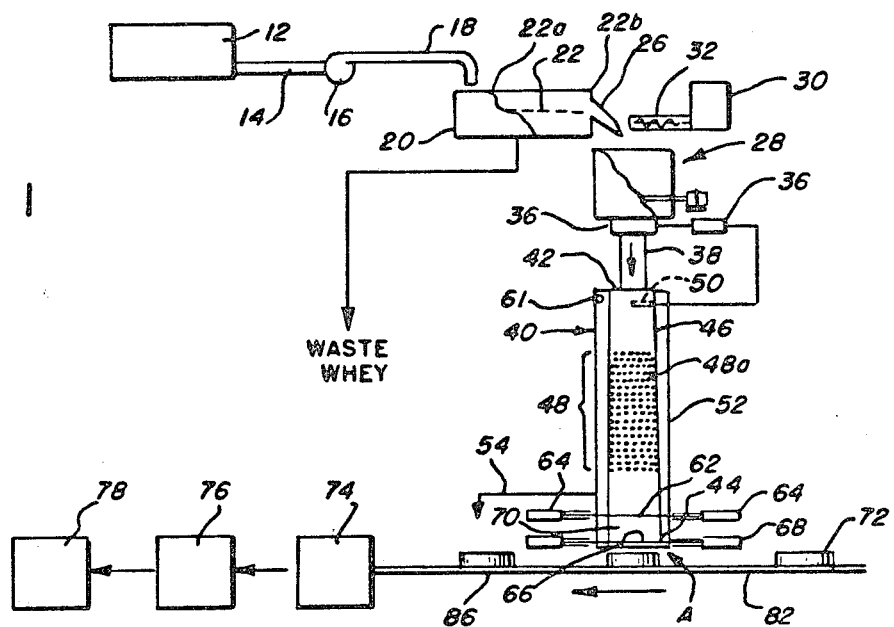
FIG. 1 is a schematic, diagrammatic view of one preferred embodiment of the apparatus of this invention suitable for use in the manufacture of cheese curd loaf.
Figure 2:
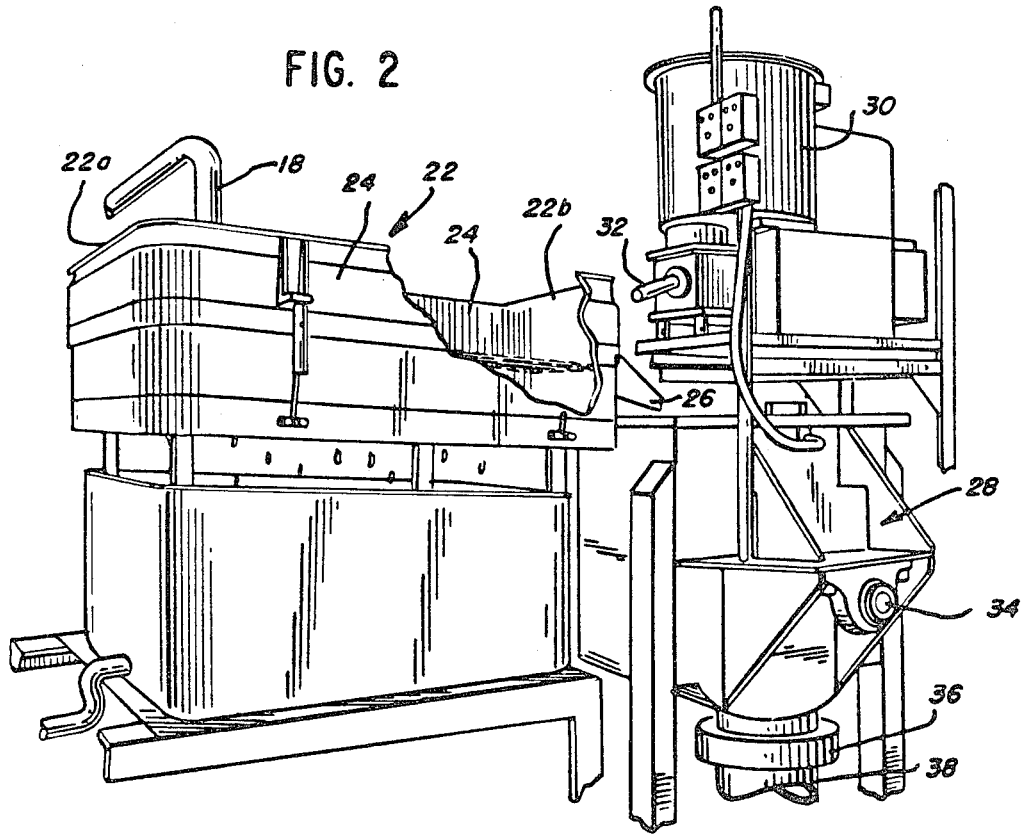
FIG. 2 is an enlarged perspective view of the curd dewheying, salt addition and curd blending stations diagrammatically illustrated in FIG. 1.

Although numerous modifications and variations are known, the basic method of making cheese involves inoculating milk with a cheese starter culture and incubating for a predetermined period, adding a coagulant to form cheese curd and whey, separating the curd from the whey, pressing the curd into a mass in a cheesecloth in a form or hooping the curd to form a loaf, brining the green cheese curd loaf and curing the cheese by aging for the requisite period of time. As will be herein appreciated, the apparatus and method of the present invention are useful in processing the curd to the loaf form, which is followed by brining of the loaf and aging.

Referring to FIGS. 1 through 4, a mixture of cheese curd and whey is withdrawn from vat 12 through outlet 14, pump 16 through conduit 18 to a vibrating screen dewheying station 20 where the predominant part of the whey is separated from the curd. Generally, the curd/whey mixture in vat 12 contains about 9 parts of whey to 1 part of cheese curd by weight and essentially all the whey (9 parts) is removed at the dewheying station 20.

Since excessive movement of the curd can damage the curd by breaking it up and thereby cause a loss of butterfat, it is desirable to avoid sharp corners and small orifices, etc., in the outlet conduits 14 and 18 and pump 16. For the same reason, it is also desirable and preferred not to pump the mixture of cheese curd and whey against a gravity head. It has been found that the curd/whey mixture can be satisfactorily pumped at a rate of about 2000 pounds per minute by suitable, commercially available pumps, such as the Model PR 300-4-UC2-2L-S, of Ladish Co., Kenosha, Wis. In a specific embodiment, a uniform, 3-inch diameter stainless steel pipe which has a standard No. 4 dairy finish has been used for conduits 14 and 18. It has also been found that placement of the vat 12 at a position which is approximately at the same level as the dewheying station 20 permits the curd/whey mixture to be pumped substantially horizontally from the vat 12 to the dewheying station 20.

The dewheying step thus effects a separation of the whey component and recovery of a solid curd. While a variety of devices may be used to initially dewhey the curd/whey mixture, a vibrating screen-type separator 20 has been found satisfactory for this purpose.

The curd and whey mixture is introduced via conduit 18 to inlet end 22a of dewheyer 20 and is deposited on screen 22. The major proportion of the whey passes through the openings in vibrating screen 22 while the cheese curd is retained on the surface of screen 22. The walls 24 of the dewheying means 20 extend about 6 inches above the vibrating screen 22 and serve to retain the cheese curd on the vibrating screen as it moves to the discharge end 22b of screen 22 and discharge through spout or outlet 26 into blender 28. A suitable vibrating screen separator is the Model L 44-1-0 of Rotex Inc., Cincinnati, Ohio.

Salt in hopper 30 is added at a controlled rate through a helical screw conveyor 32 to the curd as it discharges from spout 26 and falls into the blender 28. A suitable combination hopper and screw conveyor is a one inch bin feeder supplied by Vibra Screw Corp., Totowa, N.J. The feed of the helical screw conveyor 32 is regulatable and is adjusted to deliver salt at a controlled, predetermined rate to the curd as it passes into blender 28 so that the salt is uniformly distributed in the curd.

Further blending of the salt and curd is accomplished by motor driven agitator 34 disposed in blender 28. Generally, sufficient salt is added to the curd at this point to essentially meet the standard of identity established for the cheese product being made.

One of the novel aspects of this invention is that in the case of the manufacture of hard cheeses, the brine treatment time for the curd loaf has been found to be substantially reduced as compared to the brine soaking time required for a green curd loaf produced in prior art techniques where the salt content required in the finished cured cheese was entirely contributed by brine soaking. For example, the aging time for green curd loaf for hard cheese, such as Parmesan and Romano cheeses, is customarily about 21 days in the techniques of the prior art. A savings in processing time results to a large extent from the addition of salt to the curd. In the case of Parmesan cheese, the addition of salt to the curd to result in a salt content of 5-6% (dry weight basis) in the finished cheese has been found to reduce the brining time required to as short as 5 days. This represents as much as a four-fold increase in brining capacity or a 400% increase in the effective use of an existing brining facility. Generally, the time required for brining is inversely proportional to the amount of salt added to the curd. Thus, in those cases where no salt is added to the curd, the brining time is about 21 days. The addition of 2% salt permits a reduction in brining time of to 14 days and the addition of 4% salt permits a brining time of about 8 days and the addition of 5% salt in a 5 day brining time. In the process of the present invention, aging in brine is required primarily only to form and toughen the rind, and not to introduce salt into the cheese. A suitable, conventional blender is Model DRB 24 of Jones Superior Machine Co., Waukegan, Ill.

The mixture of salted curd and minor residual whey is discharged downwardly by gravity from the blender 28 through valve 36 (see FIG. 1) through a conduit 38 and into a tapered, perforated cylindrical draining column 40 which is open both at its top 42 and its bottom 44. The wall 46 of drain column 40 has a perforated sector 48. Preferably, the rate of discharge of the curd from blender 28 to drain column 40 is controlled in response to the level of curd in the draining column 40 by valve 36, which is modulated by a curd level sensor 50 suitably located at the top of the draining column 40. The conduit 38 may be a flexible hose which can be readily connected to the top 42 of the draining column 40. An 8 inch diameter food grade flexible neoprene hose has been found suitable.

The draining column 40 is typically 26 gauge stainless steel. Different sizes of the draining column 40 can be employed to produce different diameters of cheese curd loaf. A daisy type loaf having a 13 inch diameter and a 6 inch height is produced using a draining column having an 8 inch diameter top, a 13 inch diameter bottom and an overall length of 84 inches. The perforated segment 48 of the drain column is about 67 inches long and extends from a point about 8 inches from the top to a point 10 inches from the bottom. Only the perforated sector 48 is tapered. A high-hat type loaf having a 9 inch diameter and a 9 inch height has been produced using a draining column having an 8 inch diameter top, a 9 inch diameter bottom and an 84 inch side. The tapered, perforated sector of the side in this embodiment is 36 inches long and extends from a point about 38 inches from the top to a point 10 inches from the bottom.

The dimensions of the perforations 48a in the perforated segment 48 are such that whey readily passes therethrough while the salted cheese curd is retained inside the draining column, but does not plug the perforations. In addition, the preferred dimensions of perforations 48a also depend to some extent on the type of cheese curd being processed, and round perforations having a 0.03 inch diameter on 0.05 inch straight centers have been found suitable in processing cheese curd for hard cheeses like Parmesan or Romano. Round perforations having diameters of from 0.02 to 0.04 inch may be used.

Figure 3:
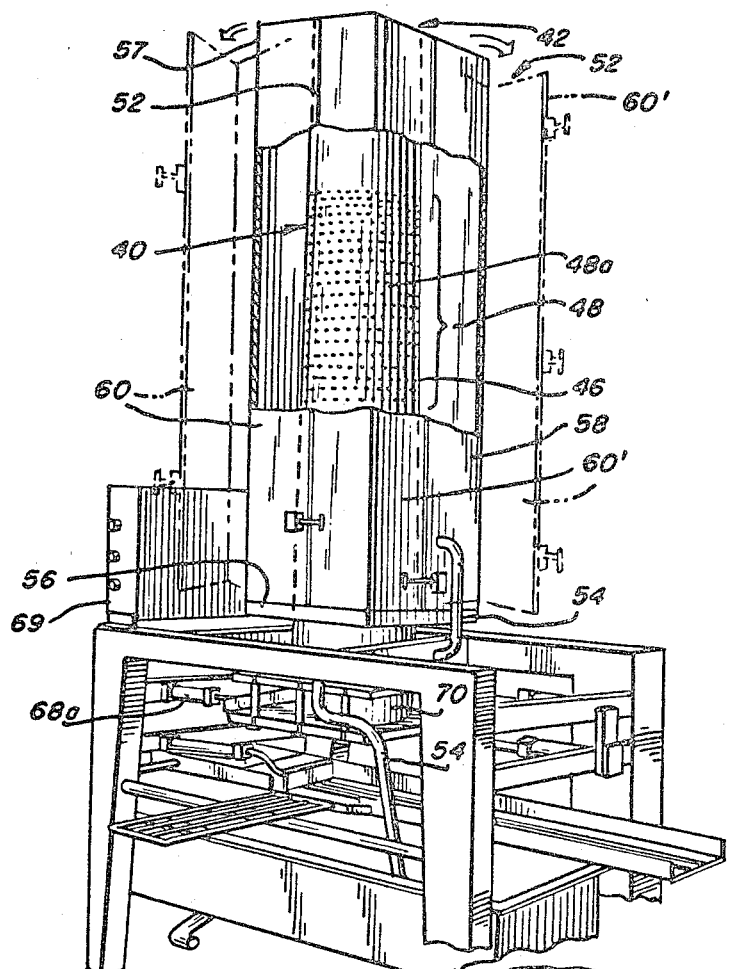
FIG. 3 is a perspective view of the curd accumulation and draining column and loaf-forming and hooping station, also diagrammatically illustrated in FIG. 1.
Figure 4:
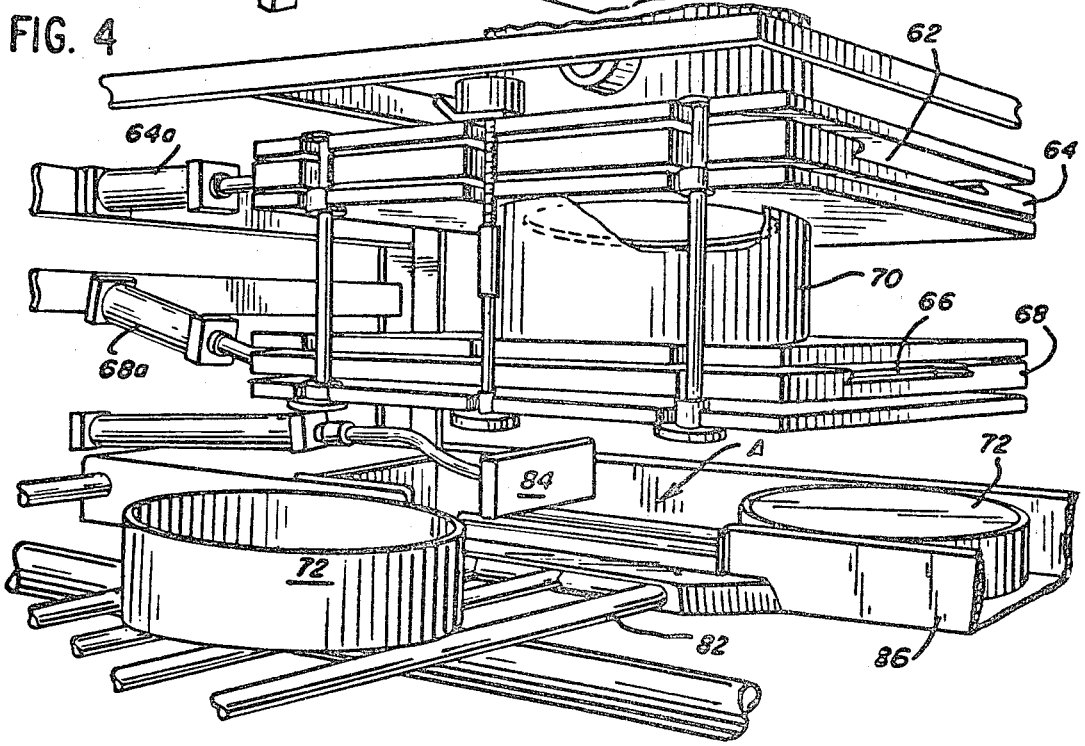
FIG. 4 is an enlarged perspective view of the loaf-forming and hooping station illustrated in FIGS. 1 and 3 with one of the guillotine blades removed from the valves.

The drain column 40, including the perforated sector 48, is surrounded by an exterior enclosure or jacket 52 spaced from the column 40 which serves as a sanitary enclosure for column 40 and to retain whey splashes which drain out of perforations 48a of 40. Drains 54 are provided at the base 56 of the jacket 52 to remove whey which drains down from the perforated surface of column 40 and is recovered or sent to waste. The jacket 52, as shown, is a rectangular cross section having a top 57, bottom 56 and side walls 58. The side walls 58 are sectored and provided with a pair of hinged doors 60 to permit ready access to the draining column 40 for cleaning or replacement purposes. The doors 60 are shown in FIG. 3, both closed and opened, with the open doors 60 and 60' indicated by broken lines. Spray nozzles 61 are provided inside jacket 52 which are used to rinse down and clean the column 40 after use.

The weight of the curd in the draining column 40 dispels air and whey from the curd and serves to compact the curd in the bottom of column 40. Thus, a sufficient height or head of curd is required in draining column 40 to achieve the desired degree of packing of the cheese curd loaf. Sensor 50 and valve 36 maintain the curd in column 40 at the predetermined sensor level which produces the requisite curd packing or density at the discharge end of the column. The packing of the salted curd increases as it moves downward in the column 40. The packed column of curd at the bottom of draining column 40 abuts on the gate 62 of a first guillotine valve 64 when it is in the closed position closing the bottom of column 40. When valve 64 is opened, the curd column drops to the gate 66 of a second guillotine valve 68 in the closed position. The guillotine valves 64 and 68 are separated by a sleeve 70 which predetermines the height and diameter of the curd loaf to be severed from the column of curd discharged from the lower end 44 of column 40. The diameter of the sleeve 70 is essentially the same as the diameter of column 40.

When the upper valve 64 is closed on the curd column extending to gate 66 of closed valve 68, it severs the curd loaf extending downward in the vertical, cylindrical space in sleeve 70 disposed between the upper valve 64 and the lower valve 68. When the lower valve 68 is opened, the severed salted curd loaf falls downward.

Thereafter, the upper valve 64 is again opened and the lower valve 68 is again closed to permit another predetermined volume of salted curd loaf to be discharged through the bottom 44 of the draining column 40, and the cycle is repeated. The opening and closing of the valves 64 and 68 by air cylinders 64a and 68a are automatically sequenced by time control 69 to provide a continuous operation of 8 to 10 26 pound loaves per minute or processing of about 40,000 pounds of curd/whey mixture in vat 12 in about twenty minutes.

A cheese loaf hoop 72 having a suitable diameter and height to contain the severed salted cheese curd loaf brought forward on conveyor 82 is positioned under the lower valve 68 at "A" to receive the severed cheese curd loaf. Preferably, the salted cheese curd loaf falls onto a cheesecloth (not shown) which is spread out in the hoop 72 and which is then wrapped around the salted curd loaf. The salted curd loaf is next pressed at 74, removed from the hoop 72 and soaked in brine in vat 76 for the requisite period to develop a rind and then placed in storage 78 for curing under controlled conditions of temperature and relative humidity.

The positioning of the hoop 72 to receive a salted curd loaf from the opening lower valve 68 is automatically sequenced and is a continuous operation. When the hoop 72 is filled with a salted curd loaf discharged from the draining column 40, the filled hoop is ejected by air cylinder ejection arm 84 which is coordinated with the opening of valve 68 and passed to conveyor 86 away from the draining column 40 and an empty hoop is automatically indexed along conveyor 82 and positioned to receive the next severed salted curd loaf.

In a specific embodiment of the method of the present invention a Romano cheese curd in vat 12, having a gross weight of 40,000 pounds, was dewheyed to remove fluid whey in dewheying apparatus 20. Salt in an amount of 5½% (dry weight basis on finished cheese) was added to the curd in blender 28. Cheese curd loafs having a diameter of 13 inches, a height of 6 inches and a weight of about 26 pounds were produced at a rate of eight per minute. The entire curd vat was emptied and processed to green cheese curd loaves in about 20 minutes.

Each loaf was pressed for about 1½ hours and the cheesecloth wrapper and hoops were removed. The green curd loafs were placed in a saturated brine solution for 5 days to develop a rind, removed and placed in a cheese curing warehouse for 5 to 10 months for curing and aging. A similar run was made with Parmesan cheese which involved the addition of 4% salt to the Parmesan cheese curd. In this instance the brining time was 8 days.

As noted above, the brining time for hard cured cheeses is reduced by the process of the present invention by adding the salt to the curd rather than relying on brining of the green cheese curd loaf to introduce the requisite salt into the final cheese product. While the most desirable procedure is to add the amount of salt that is desired in the end product, a lesser amount can be added but a commensurate extension of brining time is required to result in the desired salt level. The cheese products produced by the process of this invention are of high quality and considered to be more uniform than the cheese produced by the prior art methods. For example, by the old brine soaking techniques, the cheeses had a salt content gradient, the outer portions having a much higher salt content than the center. Differences in texture, salting and flavor were observed that are not present in the cheeses produced by the process of the present invention.

In addition to the above, the cheeses that are produced using the apparatus described herein are subjected to minimal handling by humans and consequently are a more sanitary product, which is to say, freer of contaminants that are associated with hand processing or any kind of processing where there is a substantial amount of handling.

The equipment is designed for ready cleaning between batches or ready replacement of a variety of draining columns and sleeves that are suited to the cheese being processed. The automatic features of the apparatus are also calculated to minimize the requirement for manual handling and the possibility of injury and contamination, as well as reduced costs, are achieved thereby.

From the above description, it is apparent that the objects of the present invention have been achieved. While only certain embodiments and various modifications have been set forth, alternative embodiments and various modifications will be apparent from the above description to those skilled in the art and are considered equivalents and within the spirit and scope of the present invention.

What is claimed is:

1. A method for preparing a salted cheese curd loaf, comprising:
    (a) dewheying a mixture of cheese curd and whey to remove the preponderance of liquid whey therefrom;
    (b) introducing the resulting curd into a blender having a valved discharge outlet for holding said curd and a small amount of residual whey and combining therewith a predetermined amount of salt which is essentially that amount desired in a final cured cheese to form a salted cheese curd;
    (c) discharging the salted cheese curd to a cylindrical downwardly and outwardly tapered curd accumulation, draining and dewheying column having a perforated segment formed therein to permit whey to pass therethrough and out of the draining column while retaining the salted cheese curd in the draining column to form a downwardly and outwardly tapered curd column;
    (d) maintaining a sufficient head of salted cheese curd in the draining column to form a column of curd and to dispel excess whey therefrom and thicken and compact the salted cheese curd to the desired loaf-forming consistency as it moves downward in the draining column;
    (e) sequentially severing and discharging a predetermined amount of the compacted salted cheese curd from the discharge end of the curd column in a uniform series of salted cheese curd loaves severed from the bottom of the curd column formed in the draining column, whereby the curd column is intermittently impacted by downward dropping of the curd column as a result of the sequential severing and discharging of each cheese curd loaf from the end of the curd column;
    (f) introducing the discharged curd loaves into a series of sequentially conveyed cheese curd loaf receiving forms sequentially disposed in curd loaf receiving position adjacent the discharge end of said curd column;
    (g) pressing the loaves in the loaf receiving forms;
    (h) removing pressed cheese curd loaves from the cheese curd loaf receiving forms;
    (i) contacting the cheese curd loaf with a brine solution by immersion of the loaves for a time sufficient to form a rind on said loaf, but not sufficient to substantially alter or increase the salt content of the cheese curd loaf; and
    (j) removing the rinded cheese loaf from the brine solution and curing the rinded cheese loaf for a defined period of time required by the standard of identity for the cheese being made.

2. A method according to claim 1 wherein the brining time required is between about 5 and 14 days.

3. A method according to claim 1 wherein the cheese is a hard cheese selected from the group consisting of Parmesan, Romano, Asiago, Fontinella and Kasseri, which are conventionally aged for a period of at least four months.

4. A process according to claim 3 wherein the cheese is Parmesan, the amount of salt added to the cheese curd during blending is at least five percent by weight (dry basis) of the final cured cheese product and the brining time is about 5 or 6 days.

5. A method according to claim 1 wherein the cheese produced is a Parmesan cheese and which method additionally comprises adding salt to the dewheyed curd in an amount of about 5% (dry weight basis) of the final cured cheese, brining the green cheese loaf in a saturated brine solution for a period of about 5 days and thereafter curing the brined cheese curd loaf for a period of at least about five months.

* * * * *